United States Patent [19]
Sakaguchi et al.

[11] Patent Number: 5,799,697
[45] Date of Patent: Sep. 1, 1998

[54] PRESSURE REGULATING VALVE

[75] Inventors: Yoshikazu Sakaguchi, Anjo; Takenori Kano, Toyota; Koichi Ichigo, Hekinan; Takeya Oka, Nagoya, all of Japan

[73] Assignee: Aisin AW Co., Ltd., Japan

[21] Appl. No.: 703,678

[22] Filed: Aug. 27, 1996

[30] Foreign Application Priority Data

Aug. 31, 1995 [JP] Japan .................... 7-245099

[51] Int. Cl.$^6$ .................................. F15B 13/044
[52] U.S. Cl. ........................ 137/625.65; 74/527
[58] Field of Search ............. 137/625.65; 74/527

[56] References Cited

U.S. PATENT DOCUMENTS

| | | | |
|---|---|---|---|
| 3,226,999 | 1/1966 | Allison | 74/527 |
| 3,411,377 | 11/1968 | Golbeck | 74/527 |
| 3,516,303 | 6/1970 | Imgrund | 74/527 |
| 3,587,457 | 6/1971 | Morris | 74/527 X |
| 5,589,671 | 12/1996 | Hackbarth et al. | 74/527 X |

FOREIGN PATENT DOCUMENTS 3-204488  9/1991  Japan .

*Primary Examiner*—Gerald A. Michalsky
*Attorney, Agent, or Firm*—Lorusso & Loud

[57] ABSTRACT

A pressure regulating valve includes a valve body with an input port, an output port and a drain port. A valve member is slidably arranged in the valve body for controlling the fluid communication among the ports and is positioned by an electromagnetic solenoid and a spring, both of which apply loads to the valve member. A spring load setting mechanism is used to move the valve member to a position at which a load according to an input signal to the electromagnetic solenoid, the load of the spring and a feedback pressure are balanced. A supply pressure fed to the input port is thereby regulated and output from the output port. The load setting mechanism includes a receiving plug screwed into the valve body for holding and supporting the spring in a compressed state and a retainer fixed on the valve body for holding the receiving plug against rotation. The receiving plug has an indexed portion at its distal end which is engaged by the restrainer for establishing a rotational position. One of the retainer and the indexed portion of the receiving plug has recesses whereas the other has protrusions for engaging the recesses.

8 Claims, 4 Drawing Sheets

PRESSURE REGULATING VALVE

BACKGROUND OF THE INVENTION

1. Field of the Invention

The present invention relates to a pressure regulating valve and, more particularly, to an electromagnetic type pressure regulating valve having spring load setting means.

2. Related Art

Generally speaking, electromagnetic pressure regulating valves regulate a supply pressure received at an input port and output the regulated pressure at an output port, responsive to an electric signal to an electromagnetic solenoid, by actuating a valve member according the net of the load of the electromagnetic solenoid, a spring load and a feedback oil pressure. In order that variances in the relationship of the output pressure to the input signal, due to the manufacturing tolerances for the valve body, the valve member, the spring and the electromagnetic solenoid, and variances in load characteristics relative to the input signal of the electromagnetic solenoid may be confined within a predetermined allowable range, the electromagnetic valve is equipped with load setting means whereby the compression load of the spring can be mechanically adjusted.

Such a spring load setting means is exemplified in the prior art by that disclosed in Japanese Patent Laid-Open No. 204488/1991. In this prior art valve a threaded receiving plug, screwed into one end of the valve body, is held in a predetermined position while supporting a compressed spring in abutment against a valve member. The receiving plug has opposing parallel index faces on a hexagonal index head, formed as a distal end portion of the receiving plug. The receiving plug is restrained against rotation by the cantilever leaf spring portions of a holding member which is fixed to the valve body. The spring load can be adjusted by turning the index head, to drive or loosen the receiving plug, against the restraining force of the leaf spring portions, to change the extent of compression of the spring. After such adjustment the receiving plug is held against rotation in that position by the restraining force of the leaf spring portions.

Incidentally, the aforementioned load setting means of the prior art employs six index faces on the hexagonal index head, and the angle of rotation between two adjacent index faces is 60 degrees so that the minimum change in the oil pressure to be made in rotation between the adjoining index faces is naturally restricted by the relation to the screw pitch. FIG. 6 plots a relationship, for this valve, between the signal current I (or the duty cycle % of the current) and the output oil pressure P (Kgf/cm$^2$). If the allowable range for error in the output oil pressure for each current value is ±b, the oil pressure characteristics cannot be confined within the allowable range unless the change "a" in the oil pressure by rotation of the receiving plug through an angle of 60 degrees is a <|2b|.

In recent years, the linear solenoid valve or pressure regulating valve, as used in a vehicular automatic transmission for controlling the oil pressure, has a narrower allowable range for variation of the oil pressure, reflecting a desire for higher accuracy as the control of the automatic transmission becomes the more complex. This makes it necessary to provide for finer adjustment of the spring load. This need suggests making the index head of the receiving plug more polygonal, i.e. increasing the number of index faces. However, as the number of index faces is increased, the shape of the index head more resembles a circle. Specifically, as the number of index faces is increased, their circumferential length becomes shorter, thereby reducing the contact area for engagement by the leaf spring portions of the holding member. On the other hand, the dihedral angle of the apices between the index faces becomes more obtuse as the number of apices increases, so that the force required for the leaf spring portions to ride over the apices becomes lower, allowing the receiving plug to turn more easily. In addition, the receiving plug for setting the spring load is always biased toward loosening by the compression of the spring. As a result, if the pressure regulating valve is mounted in a location subject to vibration, the receiving plug may be turned by the vibration even though it is elastically clamped by the leaf spring portions, and the setting for the spring load may thereby change.

SUMMARY OF THE INVENTION

It is, therefore, a first object of the present invention to provide a pressure regulating valve which has spring load setting means for fine setting of the load of a spring.

Another object of the present invention is to provide a pressure regulating valve capable of reliably retaining the setting.

In order to achieve the first object, the present invention provides a pressure regulating valve including a valve body having an input port, an output port and a drain port. A valve member is slidably mounted in the valve body for controlling the fluid communication between the ports as dictated by loads imposed thereon from an electromagnetic solenoid and a spring. Spring load setting means is provided to position the valve member where the loads according to an input signal to the electromagnetic solenoid, the load of the spring and a feedback pressure are balanced. A pressure supplied to the input port is thereby regulated and the regulated pressure is output from the output port. The load setting means includes a threaded receiving plug, screwed into the valve body and supporting the spring in a compressed state, and a holding member fixed to the valve body for restraining the receiving plug against rotation. The receiving plug has an indexed portion at its distal end which is engaged by the holding member for establishing a rotational index. One of the holding member and the index portion of the receiving plug has recesses whereas the other has protrusions mating with the recesses.

In order to achieve the second object of the present invention, the holding member has a pair of leaf springs for clamping the index portion of the receiving plug.

DESCRIPTION OF THE PREFERRED EMBODIMENTS

Figure 2:
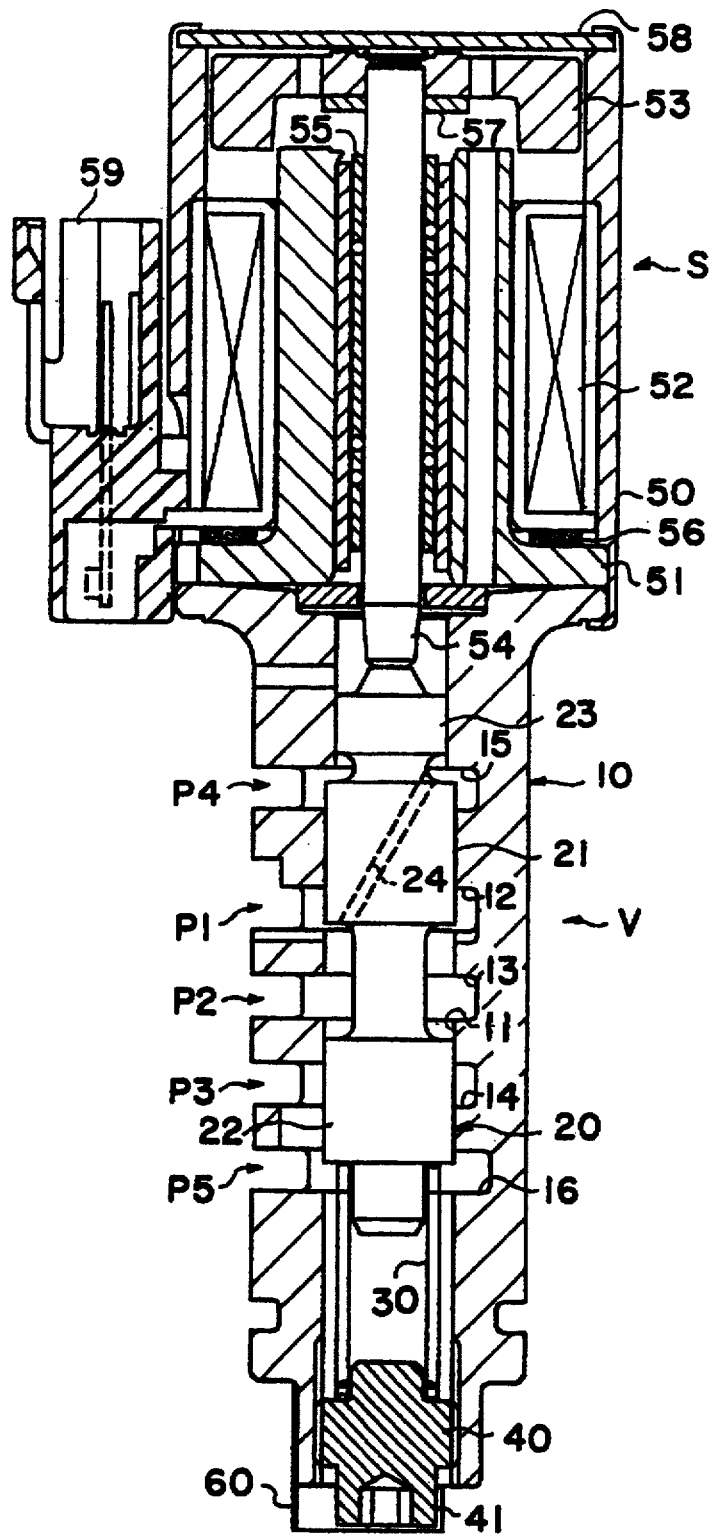
FIG. 2 is a cross-sectional view showing the entire pressure regulating valve of the first embodiment.

Embodiments of the present invention will be described with reference to the accompanying drawings. FIG. 2 illustrates a first embodiment of a pressure regulating valve of the present invention. In this first embodiment, the pressure regulating valve is designed to operate as a linear solenoid valve (hereinafter "valve") in a hydraulic control system of an automatic transmission. As seen in FIG. 2, the valve includes an electromagnet assembly S joined to a pressure regulating assembly V. The joined electromagnet assembly S and pressure regulator assembly V are fitted within a valve bore in the valve body of the automatic transmission with the electromagnet assembly S and the leading end of the pressure regulator assembly V exposed to the exterior.

The valve body of the pressure regulator assembly V is a sleeve 10 having an axially extending, spool-receiving bore 11, in which is slidably arranged a spool 20 acting as the valve member. The sleeve 10, in addition to the spool receiving bore 11, also has five ports P1 to P5 axially spaced from one another and circumferential grooves 12 to 16 providing communication between those ports and the spool receiving bore 11. The sleeve 10 has a radially extending flange for mounting the electromagnet assembly S. The spool 20 has two radially larger lands 21 and 22 and one radially smaller land 23 for providing/blocking communications between the adjoining circumferential grooves 12 to 16 and the spool receiving bore 11. The end of the spool 20, facing the electromagnet assembly S, abuts against a shaft 54. A spring 30 is mounted within the spool receiving bore 11 of the sleeve 10, at the end opposite the electromagnet assembly S. Spring 30 is under compression with its one end abutting against the radially larger land 22 of the spool 20 and its other end abutting against a screw plug 40 acting as a pressure receiving plug. This screw plug 40 is threaded into an extension of the spool receiving bore 11, until it is positioned and fixed in a position to apply a predetermined load to the spool 20.

The electromagnet assembly S is an electromagnetic solenoid which includes a core 51 having a radially extending flange abutting against the radially extending flange of the sleeve 10. The flanges are fixed together by bending over the inner end portion of the solenoid case. The electromagnetic solenoid further includes a coil 52 mounted in the case 50 and fitted around the core 51, a plunger 53 arranged facing the outer end of the core 51 and a shaft 54 having one end fixed to the plunger 53. In the hollow of the core 51 is a linear ball bearing 55 for slidably supporting the shaft 54 in the core 51. A filter 56 acts as a damper for preventing the coil from moving. A spacer 57 made of a non-magnetic material such as brass serves to maintain a minimum gap between the core 51 and the plunger 53. Also shown in FIG. 2 are a plate 58 covering the opening of the case 50 and a socket 56 serving as a connector plug for connecting the coil 52 with the electronic control unit (not-shown).

Figure 1:
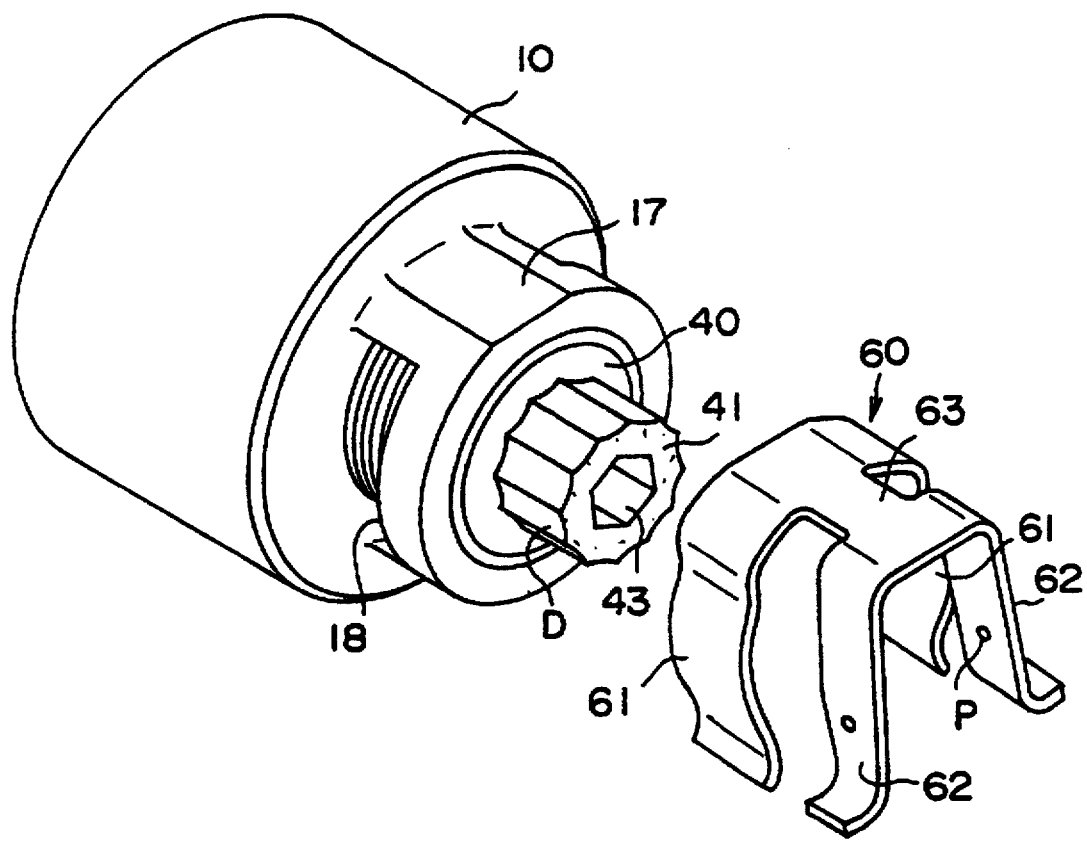
FIG. 1 is an exploded perspective view showing spring load setting means of a pressure regulating valve according to a first embodiment of the present invention.

As shown in detail in the exploded perspective view in FIG. 1, the spring load setting means is composed of: the screw plug 40 which supports the spring 30 (as shown in FIG. 2) under compression; and a retainer 60 fixed on the sleeve 10 and acting as a holding member for holding the screw plug 40 against turning. This screw plug 40 has an index head 41, with a dodecagonal shape in the present embodiment, at its outer end for indexing the retainer 60. Moreover, one of the retainer 60 and the index head 41 of the screw plug 40 is formed with recesses D (located in the index head 41 in the present embodiment) and the other is formed with protrusions P (on the retainer 60 in the present embodiment) for engaging the recesses D.

Figure 3:
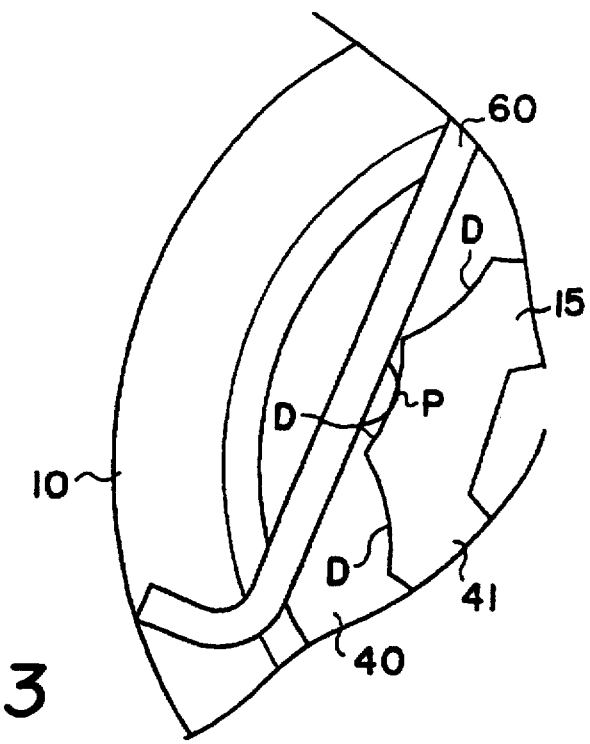
FIG. 3 is an end view showing the spring load setting means of the pressure regulating valve of the first embodiment on an enlarged scale.

As shown on an enlarged scale in FIG. 3, in the present embodiment, the recesses D, formed in the index head 41 of the screw plug 40, are the indexing faces recessed with a concave cylindrical shape. This particular construction is adopted to facilitate manufacture of the recesses D which can be easily formed while the screw plug 40 is being cold-forged.

The retainer 60 is made of a spring material and is composed of: a pair of fitting portions 61 forming a snapping for fixing the retainer on the sleeve 10, a pair of leaf spring portions 62 forming a clamp and an axial trunk 63 joining the fitting portions 61 and the leaf spring portions 62. The retainer 60 thus constructed is prevented from turning and from axial movement by aligning the axial trunk 63 with a chamfered portion 17 of the sleeve 10 and by fitting the fitting portions 61 of the snap-ring into a pair of circumferential slots 18 formed in the sleeve 10. The protrusions P of the retainer 60 are shaped as semispherical projections which are easily formed by pressing the leaf spring portions 62.

In the spring load setting means of this first embodiment, the load to be applied to the spool 20 is set by inserting a hexagonal allen wrench or the like into hole 43 which is formed at the center of the index head 41, and by suitably turning the screw plug 40 about its axis to change the degree of compression of the spring 30. In making such a setting, the clamping leaves of the retainer 60 are elastically deformed and expanded, as the dihedral angle of the index head 41 of the screw plug 40 rides over the protrusions P, so that they allow the screw plug 40 to turn on under a suitable torque load. Thus, the screw plug 40 can be reset and operated after the valve is assembled in the valve body of the automatic transmission. After setting, the recesses D are engaged and held by the protrusions P under the elastic spring force of leaves 62, so that the pressure receiving plug is prevented from becoming loosened by vibration.

Reverting to FIG. 2, with no solenoid current (no load), the spool 20 is held in the uppermost position, as shown, by the load of the spring 30. In this position, the output port P2 communicates with the input port P1, but the drain port P3 does not. As a result, the supply pressure, as supplied from the input port P1, is partly output as is from the output port P2 and partly fed to the circumferential groove 15 via an in-spool oil passage 24, so that it is fed back as a secondary pressure to the radially different faces of the radially larger land 21 and the radially smaller land 23, and is balanced with the feedback pressure against the spring load.

When a signal current of the duty cycle is input from the not-shown electronic control unit to the coil 52 of the valve in its uppermost position, as described above, the plunger 53 is attracted toward the adjacent end face of the core 51 by the electromagnetic force so that the resultant load is transmitted to the spool 20 through the shaft 54.

As the spool 20 moves downward from its uppermost position as depicted in FIG. 2, the supply pressure, entering from the port P1, is throttled to a predetermined level by the land 21 and output from the output port P2. The output pressure at this time is fed back as a secondary pressure via the in-spool oil passage 24 to the radially different faces of the land 21 and the land 23 to hold the output pressure at a predetermined level while being balanced with the solenoid load, the spring load and the feedback pressure. Pressure regulation is by increasing the duty cycle of the signal current to lower the output pressure.

In short, in this embodiment, the dihedral angle of the dodecagon can be made substantially equal to that of the hexagon of the prior art by giving the index face a concave shape. As a result, the rotational torque, required for the protrusions P to ride over dihedral apex in setting, can be made substantially equal to that of the dihedral angle of the hexagon of the prior art. Thus, the setting can be made by a similar method so that the restraining force against turning can be retained to provide a proper snugness.

Figure 4:
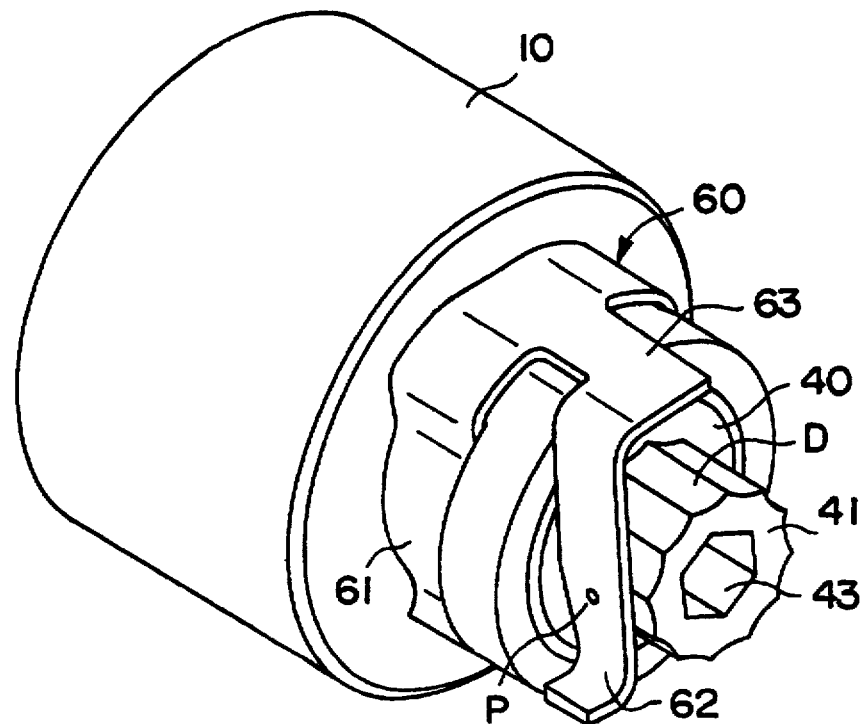
FIG. 4 is a perspective view showing a modification of the spring load setting means of the pressure regulating valve with its holding member being modified in shape.

FIG. 4 shows a modification of the retainer 60 acting as a retainer for the spring load setting means of the aforementioned embodiment. In this modification, the retainer 60 has only a single leaf spring portion 62 depending from one side of the axial trunk 63. The remaining construction is similar to that of the holding member of the foregoing first embodiment and will not be described. Corresponding members are designated by the same reference numerals. When this construction is adopted, substantially similar functions can be obtained by making the retainer 60 thicker than that of the foregoing embodiment.

Figure 5:
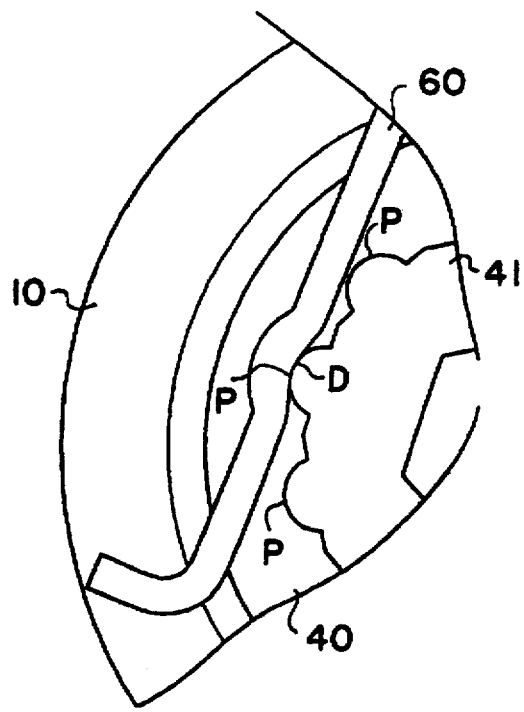
FIG. 5 is an end view showing spring load setting means of a pressure regulating valve according to a second embodiment of the present invention on an enlarged scale.
Figure 6:
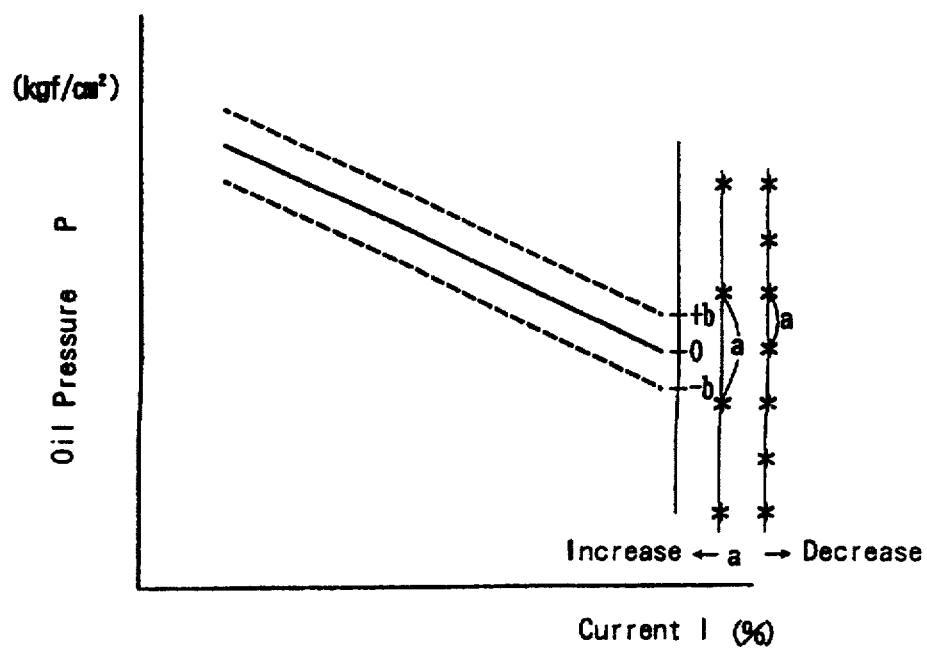
FIG. 6 is a graph of a specified pressure characteristic P of the pressure regulating valve of the prior art versus signal current I.

FIG. 5 shows a second embodiment wherein, in contrast to the first embodiment, the recesses D are formed in the retainer 60, and the protrusions P are formed on the index head 41 of the screw plug 40. In this embodiment, at least the recesses D of the retainer 60 are grooves and should have an axial length sufficient to allow for the axial movement of the screw plug 40. Thus, in this second embodiment recesses D are axially extending grooves. On the other hand, the protrusions P of the screw plug 40 may be either pointed projections or partial spheres.

No matter which of the aforementioned embodiments is adopted, the recesses D are formed in one of the retainer 60 and the index portion of the screw plug 40 whereas the bulges P are formed on the other, so that the rotational position holding function can be achieved irrespective of the area of the engaging faces, to allow accurate adjustment of the oil pressure level. In addition, the screw plug 40 can be prevented from turning by external forces such as vibrations, thus maintaining the adjusted spring load. When the screw plug 40 is clamped by the paired leaf spring portions 62 of the retainer 60 of the first embodiment, it is prevented from chattering so that it can be more reliably held in position once it is adjusted.

In the present invention, regardless of whether the recesses are formed in the holding member or in the index portion of the receiving plug, the turn stopping function can be achieved irrespective of the area of engagement between the recesses and the bulges. Thus, even if the index faces are made smaller to provide for finer adjustment of the oil pressure level, the receiving plug is prevented from being turned by external forces such as vibration, so that the adjusted spring load will be retained without fail.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A pressure regulating valve comprising:
   a valve body including an input port, an output port and a drain port;
   a valve member slidably mounted in said valve body for controlling fluid communication among said ports and for regulating a supply pressure received at said input port and outputting the regulated pressure from said output port;
   an electromagnetic solenoid and a spring for applying loads to said valve member; and
   spring load setting means for positioning said valve member where loads imposed by said electromagnetic solenoid, according to an input signal, said spring and a feedback pressure are balanced, said load setting means including:
   a threaded plug screwed into said valve body for supporting said spring in a compressed state, said threaded plug having a distal end with index means for establishing a rotational index;
   a restraining member fixed on said valve body for restraining said threaded plug against rotation,
   wherein one of said restraining member and said index means has at least one concave recess of a first radius whereas the other has projecting means for engaging said recess with a force resisting rotation of said threaded plug, said projecting means comprising at least one rounded projection having a second radius smaller than said first radius.

2. A pressure regulating valve according to claim 1, wherein said restraining member has a pair of leaf springs for clamping the index portion of said receiving plug.

3. A pressure regulating valve according to claim 2, wherein said one rounded projection is on one of said leaf springs and further comprising another said rounded projection on the other of said leaf springs.

4. A pressure regulating valve according to claim 3 wherein said one rounded projection and said another rounded projection are partial spheres.

5. A pressure regulating valve according to claim 1, wherein said distal end has a plurality of faces defining a polygon in cross-section, said faces being concave to form a plurality of said concave recesses of said first radius.

6. A pressure regulating valve according to claim 1 wherein said restraining member includes a leaf spring biased against said distal end, said one recess being formed as an axially extending groove in said leaf spring and wherein said projecting means is in the form of a plurality of protrusions equally spaced around the circumference of said distal end.

7. A pressure regulating valve according to claim 1 wherein said rounded projection is a partial sphere.

8. A pressure regulating valve according to claim 1 wherein said index means and said restraining member cooperate to provide at least 12 positions for said rotational index.

* * * * *